W. TODD.
Rubber Jam-Nuts.

No. 134,823.             Patented Jan. 14, 1873.

Witnesses.
Wm. W. S. Dyre.
Edw. W. Donn

Inventor.
Westly Todd
By J. J. Johnston & Bro.
his attorneys

AM. PHOTO-LITHOGRAPHIC CO. N.Y. (OSBORNE'S PROCESS.)

UNITED STATES PATENT OFFICE.

WESTLY TODD, OF ALLEGHENY CITY, ASSIGNOR TO HIMSELF AND EDWARD A. KITZMILLER, OF PITTSBURG, PENNSYLVANIA.

IMPROVEMENT IN RUBBER JAM-NUTS.

Specification forming part of Letters Patent No. 134,822, dated January 14, 1873.

*To all whom it may concern:*

Be it known that I, WESTLY TODD, of the city and county of Allegheny, in the State of Pennsylvania, have invented a certain new and useful Improvement—viz., a Metal-Clad Gum Jam-Nut; and I do hereby declare that the following is a full, clear, and exact description thereof, reference being had to the accompanying drawing and to the letters of reference marked thereon.

The nature of my invention consists in providing a new article of manufacture, viz., a metal-clad gum jam-nut constructed as hereinafter described.

To enable others skilled in the art to construct my new article of manufacture, I will proceed to describe more fully its construction and operation.

Figure 1:
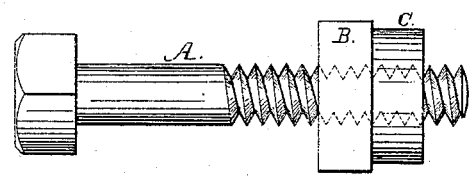
Figure 2:
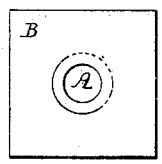
Figure 3:
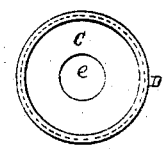

In the accompanying drawing, which forms part of my specification, Figure 1 represents an ordinary bolt and its nut with my improved jam-nut applied thereto; Fig. 2 is an end view of an ordinary bolt and its nut; Fig. 3 is a face view of my improved jam-nut; and Fig. 4 is a transverse section of the same.

In the accompanying drawing, A represents an ordinary iron screw-bolt, and B its nut. C represents my improved jam-nut, which is constructed of vulcanized India rubber and is circular in form, its thickness being about that of the ordinary iron screw-nut. The opening *e* for the bolt is about one-half less than the diameter of the bolt for which it is intended. The periphery of the nut is covered with sheet metal, the edges of the metal lapping over slightly on the faces of the nut, sufficient to prevent it from being displaced. The nut is forced upon the bolt through the medium of a lever or other suitable device.

By having the gum nut metal-clad, as hereinbefore described, it will prevent it from being cut or otherwise injured. The circular form of the gum jam-nut I have found to be the best and cheapest.

Figure 4:
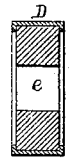

D represents the sheet metal on the periphery of the gum nut C, clearly shown in Figs. 3 and 4. The sheet metal may be either iron, brass, copper, zinc, or tin, and should not exceed one thirty-second of an inch in thickness.

Other forms may be given the gum jam-nut for the purpose of ornamentation; but for general use the circular form will be found the best for economy in construction.

When sheet-iron is used for covering the periphery of the gum nut it should be galvanized or otherwise coated to prevent it from rusting; and in case tin is used it will be found advantageous to paint it.

I wish it clearly understood that I do not claim, broadly, a gum jam-nut; nor do I claim a gum nut with the opening for the bolt of less diameter than the diameter of the bolt for which it is intended; neither do I claim forcing the gum nut upon the bolt by means of a lever or its equivalent; nor do I claim, broadly, a gum nut clad with iron. The main feature of my invention consists in surrounding the periphery of the gum nut with a band of thin sheet metal, with its edges turned down on the inner and outer faces of the nut.

Having thus described my improvement, what I claim as of my invention is—

A new article of manufacture, viz., a gum jam-nut, with the walls of its opening parallel and the diameter of the said opening less than the diameter of the bolt upon which it is to be placed, the periphery of the said nut being surrounded with a band of thin sheet metal, substantially as hereinbefore described, and for the purpose set forth.

WESTLY TODD.

Witnesses:
A. C. JOHNSTON,
JAMES J. JOHNSTON.